United States Patent [19]

Ikeda et al.

[11] Patent Number: 4,904,033
[45] Date of Patent: Feb. 27, 1990

[54] METHOD FOR CONSTRUCTING HOLOGRAMS

[75] Inventors: Hiroyuki Ikeda; Fumio Yamagishi; Shinya Hasegawa; Syunji Kitagawa; Kozo Yamazaki; Takefumi Inagaki, all of Kanagawa, Japan

[73] Assignee: Fujitsu Limited, Kawasaki, Japan

[21] Appl. No.: 196,754

[22] Filed: May 18, 1988

Related U.S. Application Data

[63] Continuation of Ser. No. 467,773, Feb. 18, 1983, abandoned.

[30] Foreign Application Priority Data

| Feb. 23, 1982 | [JP] | Japan | 57-029637 |
| Feb. 23, 1982 | [JP] | Japan | 57-029638 |
| Mar. 16, 1982 | [JP] | Japan | 57-042455 |
| Mar. 30, 1982 | [JP] | Japan | 57-051497 |
| Apr. 28, 1982 | [JP] | Japan | 57-071828 |
| May 31, 1982 | [JP] | Japan | 57-092823 |

[51] Int. Cl.$^4$ .............................................. G03H 1/20
[52] U.S. Cl. ...................................... 350/3.69; 350/320
[58] Field of Search ............................... 350/3.69, 320

[56] References Cited

U.S. PATENT DOCUMENTS

| 3,522,979 | 8/1979 | Wuerker . |
| 3,647,289 | 3/1972 | Weber ............................. 350/3.69 |
| 3,752,557 | 8/1973 | Belvaux ........................... 350/3.69 |
| 3,758,186 | 9/1973 | Brumm . |
| 3,944,322 | 3/1976 | Benton ............................. 350/3.65 |
| 4,235,504 | 11/1980 | Ikeda et al. . |
| 4,416,540 | 11/1983 | Nicholson ....................... 350/3.69 |
| 4,445,749 | 5/1984 | Benton ............................. 350/3.69 |

FOREIGN PATENT DOCUMENTS 2049986 of 0000 United Kingdom .

OTHER PUBLICATIONS

IBM TECHNICAL DISCLOSURE BULLETIN, "Method for Producing Sub—Master Holograms", by Dickson, vol. 24, No. 4, Sep. 1981, pp. 1896–1897.
SOV. J. OF QUANTUM ELECTRONICS, "Hologram Copying (Review)", by Vanin, vol. 8, No. 7, Jul. 1978, pp. 809–819.

Primary Examiner—Bruce Y. Arnold
Attorney, Agent, or Firm—Staas & Halsey

[57] ABSTRACT

A method for constructing a hologram by use of a master hologram which includes a predetermined pattern of interference fringes formed thereon by optical interference of a plurality of constructing coherent light beams incident at different angles. The method includes preparing a photosensitive medium, in which the hologram is to be formed, on the master hologram, and copying the master hologram onto the photo-sensitive medium by impinging copying light beams onto the master hologram at an incident angle different from the angles of the constructing beams.

14 Claims, 11 Drawing Sheets

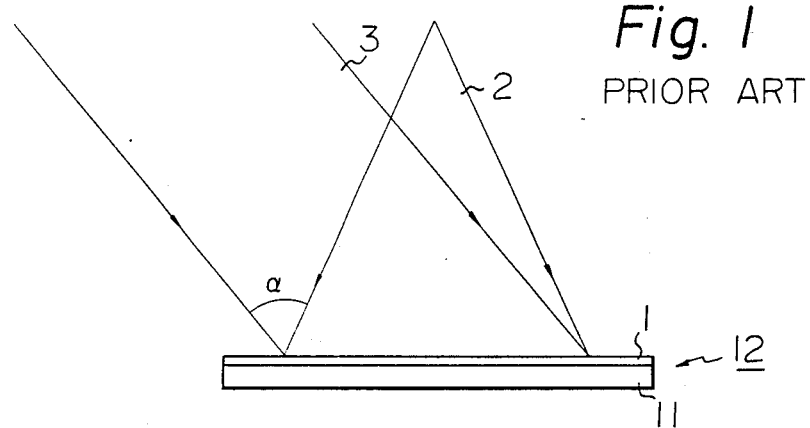
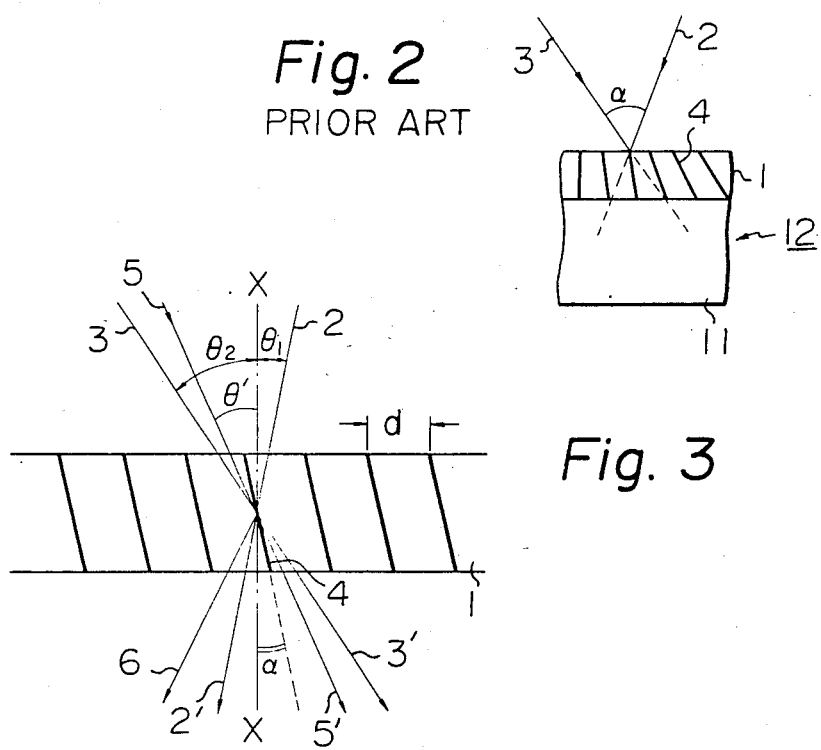

METHOD FOR CONSTRUCTING HOLOGRAMS

This application is a continuation application of U.S. Ser. No. 467,773, filed Feb. 18, 1983, now abandoned.

BACKGROUND OF THE INVENTION (1) Field of the Invention

This invention relates relates to a method for constructing a hologram which can be used, for example, in a hologram scanner applied, for example, to a point-of-sale (POS) system.

(2) Description of the Prior Art

POS systems have come into increasing use in supermarkets, department stores, and other commercial sales outlets in recent years. Use of a POS system enables computer monitoring of a large quantity and variety of goods and, accordingly, automatic calculation and classification of the sales and supply of those goods. In POS systems, information concerning each of the goods is marked directly on the goods in advance by attaching a bar-code label. The bar-codes can be read and detected by the aid of holograms.

A hologram is constructed by optical interference of two coherent light beams. More specifically, a laser source provides a laser beam. The laser beam is separated into two beams, for example, by means of a beam splitter or a half mirror. The first laser beam is, for example, a plane wave (so-called reference wave). The second beam is, for example, a spherical wave (so-called objective wave). These two construction laser beams impinge on a photosensitive layer coated on a transparent glass plate (base plate) at different incident angles. As a result, interference fringes are produced in the photosensitive layer. The interference fringes form so-called diffraction gratings.

In reconstructing a hologram as constructed above, for example, for the purpose of scanning, or copying it, one usually uses reconstruction laser beams having the same incident angle as that of one of the afore-mentioned construction laser beams. Use of identical laser beams results in maximum diffraction efficiency of the beams since the incident angles of the reconstruction beams are thus always Bragg angles with respect to the inclined angles of interference fringe planes of the hologram at any point corresponding to the fringe planes. Use of identical reconstruction beams, however, also results in the problem of large aberration of the wavefront obtained by the reconstruction of the hologram.

To decrease aberration, the assignee of this application previously proposed in U.S. Pat. No. 4,235,504 to reconstruct a hologram by using reconstruction beams having wavefronts different from those of the construction beams. However, the use of such reconstruction beams different from the construction beams resulted in a decreased diffraction efficiency. That is, it was not possible to decrease the aberration and maintain a high diffraction efficiency at the same time.

SUMMARY OF THE INVENTION

The primary object of the invention is to achieve both increased diffraction efficiency and decreased aberration.

Another object of the invention is to provide a method for constructing a hologram from a preconstructed master hologram so as to increase the diffraction efficiency of the reconstruction or copy beams and to decrease the aberration.

In accordance with the present invention, there is provided a method for constructing a hologram by use of a master hologram produced by optical interference of a plurality of construction coherent light beams, comprising: preparing a photosensitive medium on which the hologram is to be formed on the master hologram and copying the master hologram onto the photosensitive medium by impingement of a copying light beam onto the master hologram at incident angles different from the Bragg angles.

With this method, the copied hologram has a predetermined pattern of interference fringes identical to that of the master hologram, but the inclined angles of the fringe planes of the copied hologram are different from the inclined angles of the corresponding fringe planes of the master hologram.

Other features, additional objects, and many of the attendant advantages of this invention will readily be appreciated by reference to the following detailed description of preferred embodiments when considered in connection with the drawings.

BRIEF DESCRIPTION OF THE DRAWINGS

FIG. 1 is a schematic view of a hologram according to the prior art;

FIG. 2 is an enlarged view of a part of FIG. 1;

FIG. 3 is a longitudinal sectional view of a hologram showing a relationship between an inclined angle of fringe planes and construction beams of a master hologram used in the present invention;

DESCRIPTION OF THE PREFERRED EMBODIMENTS

Figure 4:
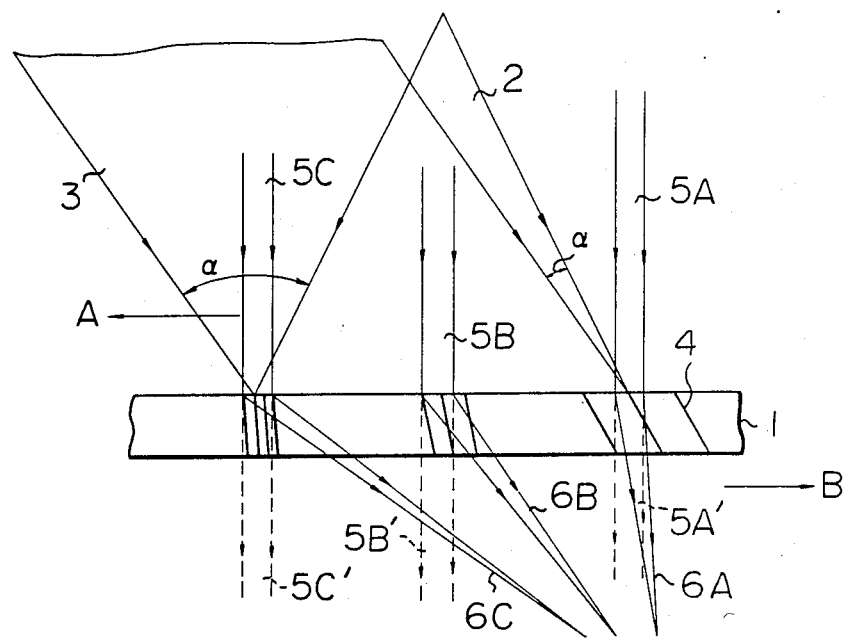
FIG. 4 is a schematic view of a relationship between construction beams and reconstruction beams, according to the present invention.

As is well known, a hologram is constructed by optical interference of two coherent light beams (construction beams), usually laser beams. In FIG. 1, numeral 11 denotes a transparent glass plate (base plate) with a photosensitive emulsion layer (e.g., silver halide particles dispersed layer) 1 coated thereon. A hologram is formed in the photosensitive layer 1. A laser source (not shown) provides a laser beam. The laser beam is separated into two laser beams 2 and 3 by means of, for example, a beam splitter or half mirror (not shown). The first laser beam 2 is a spherical wave. The second laser beam 3 is a plane wave. As shown in FIG. 2, when the plane wave 3 and the spherical wave 2 impinge on the photosensitive layer 1, a predetermined pattern of interference fringes (latent image) 4 is produced along bisector lines of angle $\alpha$, which is defined by and between the two laser beams and which depends on the impinging points. The interference fringes 4 form so-called diffraction gratings. After that, the glass plate with the photosensitive layer is developed and fixed so that black and white fringes are formed in the photosensitive layer 1. This is a so-called amplitude hologram.

There are generally two kinds of holograms, one of which is the above-mentioned amplitude hologram and the other of which is a phase hologram. A phase hologram is obtained by bleaching the amplitude hologram. That is, silver is converted to a transparent silver halide, having a large refractive index, by bleaching, so that fringes representing the refractive index variation are formed in the photosensitive layer 1. This is a phase hologram. Thus a master hologram plate 12 is constructed.

The present invention is applicable to both amplitude and phase holograms, although the following description will be mainly directed to phase holograms.

Referring to FIG. 3, the two beams 2 and 3 are incident on the photosensitive layer 1 at any incident angles $\theta_1$ and $\theta_2$ ($\theta_1 \neq \theta_2$) with respect to a vertical line X—X normal to the layer 1, respectively. The interference fringe 4 is formed on the bisector line of the two beams, as mentioned above. Namely, the inclined angle $\alpha$ of the fringe plane in which the interference fringe lies is given by the following equation;

$$\alpha = \frac{\theta_1 + \theta_2}{2} \quad (1)$$

The angles $\theta_1$ and $\theta_2$ are so-called Bragg angles with respect to the fringe plane having the inclined angle $\alpha$. The pitch d between the adjacent two fringe planes on the surface of the layer 1 is given by the following relationship;

$$d(\sin \theta_1 + \sin \theta_2) = n\lambda \quad (2)$$

wherein n is the order of diffraction of the associated beam and $\lambda$ is wavelength of the associated beam.

As is well known, when a reconstruction beam identical to the construction beam 2 is used, a part of the reconstruction beam is a zero-order transmission beam 2' and another part of the reconstruction beam is a first-order transmission diffraction beam 3' which is identical to a transmission beam of the construction beam 3. Similarly, when a reconstruction beam identical to the construction beam 3 is used, a part thereof is the first order transmission diffraction beam 3' and another part of the reconstruction beam is a first-order diffraction beam 2' identical to the transmission beam of the construction beam 2. In this way, the reconstruction beam is most effectively used, but results in a large aberration, as mentioned before.

As disclosed in the aforementioned U.S. Pat. No. 4,235,504, when a hologram is reconstructed, for example, for scanning the laser beam, it is desirable to use a reconstruction laser beam (e.g., plane wave) 5 having an incident angle $\theta'$ different from those ($\theta_1$ and $\theta_2$) of the construction beams 2 and 3 in order to decrease the aberration of the wavefront obtained by the reconstruction of the hologram. The present invention also uses the reconstruction beam 5 for the purpose of decreasing the aberration of the wavefront.

In FIG. 3, when the reconstruction beam 5 impinges on the fringe plane 4 at an incident angle $\theta'$ with respect to the surface plane of the layer 1, a part of the beam 5 is a zero-order beam 5' and a part of the beam 5 is a first-order diffraction beam 6.

In the embodiment shown in FIG. 4, the reconstruction laser beams 5A, 5B, 5C, etc. (plane wave) from the same laser beam source (not shown) are incident on the hologram (the photosensitive layer 1 with a predetermined pattern of interference fringes 4) at a right angle i.e., perpendicular to the plane of the photosensitive layer 1. That is, the incident angle $\theta'$ is 0°, and is neither identical to $\theta_1$ nor to $\theta_2$. The reconstruction beams 5A, 5B, and 5C are split to zero-order transmission 5A', 5B', and 5C' and first-order transmission diffraction beams 6A, 6B, and 6C by the hologram, respectively. To scan the laser beams by the use of the arrangement shown in FIG. 4, the reconstruction laser beams 5A, 5B, and 5C are moved relative to the hologram in the direction A or the hologram is moved relative to the reconstruction beams in the direction B. The reconstruction laser beams are not limited to a plane wave, but may be spherical wave. The spherical wave can be deemed to be a plane wave since the diameter of a laser beam spot on the hologram is very small (about 2 mm), provided that the distance between the hologram and the laser beam source is, for example, more than 160 mm, resulting in a small spread angle of the reconstruction beam.

According to the present invention, based on the principle described above, a hologram is constructed by copying the master hologram plate 12 with the use of a copy beam which is identical to the aforementioned reconstruction beam 5 in both wavelength and source location. The hologram will be referred to as a copy hologram for distinguishing it from the master hologram.

Figure 5:
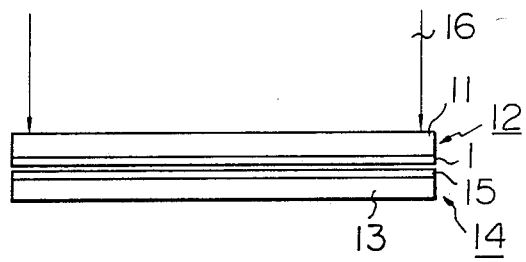
FIG. 5 is a schematic view of how to copy a master hologram to construct a copy hologram.
Figure 6:
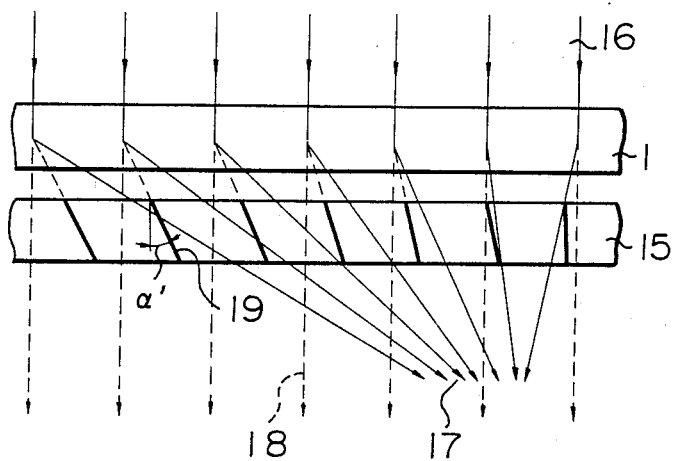
FIG. 6 is a schematic view of a copy hologram constructed by the present invention.

A copy hologram plate 14 which has a transparent glass plate 13 with a photosensitive layer 15 coated thereon is superimposed on the master hologram plate 12 in such a way that the hologram, i.e., the photosensitive emulsion layer 1, with a predetermined pattern of interference fringes 4 of the master hologram plate 12, faces and is separate from but may come into contact with the photosensitive layer 15 of the copy hologram plate 14, as shown in FIG. 5. It should be noted that although the two layers 1 and 15 are slightly spaced from one another, they can be in close contact with each other over the surface areas thereof. Copy beams 16 which are, for example, identical to the reconstruction beams 5A, 5B, and 5C in both wavelength and source location, impinge on the master hologram plate 12 at an incident angle, preferably equal to 0°, from the side of the glass plate 11. Consequently, the copy beams 16 are split into first-order transmission diffraction beams 17 and zero-order transmission beams 18, as shown in FIG. 6. Second-order, third-order, - - -, and n-order transmission diffraction beams are not considered herein. A predetermined pattern of interference fringes 19 are formed in the photosensitive layer 15 on bisector lines between the zero-order transmission beams 18 and the first-order transmission diffraction beams 17, as shown in FIG. 6. The zero-order transmission beams 18 and the first-order transmission diffraction beams 17 serve as construction beams corresponding to the beams 2 and 3 (FIG. 1) for constructing the copy hologram. The inclined angles $\alpha'$ of the interference fringe planes of the copy hologram are different from the inclined angles $\alpha$ of the corresponding interference fringe planes of the master hologram. The pattern of the interference fringes of the master hologram does not change and is the same as the pattern of the interference fringes of the copy hologram. When the copy hologram, thus obtained, is reconstructed, for example, for scanning the laser beam, a reconstruction beam identical to the beam 16 in both wavelength and source location is used so that the diffraction efficiency of the reconstruction beam is maximum because the two beams 17 and 18 split from the beam 16 satisfy the Bragg condition with respect to the copy hologram. That is, according to the present invention, the problem of aberration is solved when the master hologram is constructed, and the problem of diffraction efficiency is solved by copying the master hologram.

Figure 7:
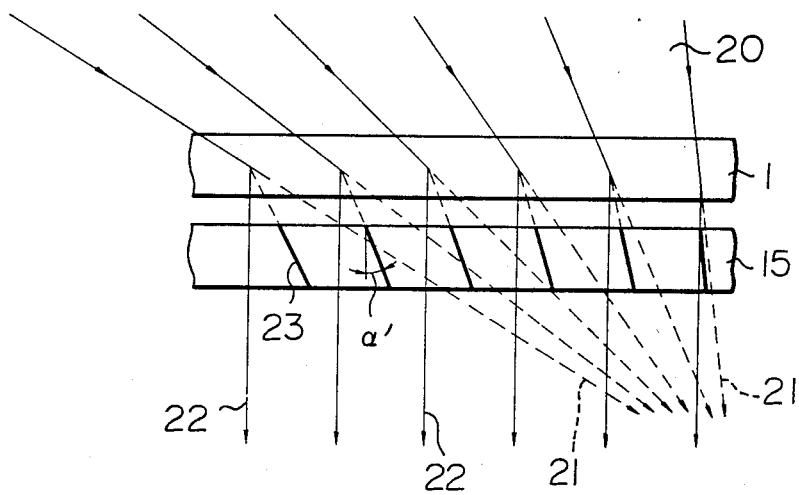
FIG. 7 is a schematic view of another embodiment different from FIG. 6.

In an arrangement shown in FIG. 7, the copy beams 20 are identical to the first-order transmission diffraction beams 6A, 6B, and 6C in FIG. 4 in place of the zero-order transmission beams 5A', 5B', and 5C'. Similar to FIG. 6, the interference fringes 23 are produced on the bisector lines between the zero-order transmission beams 21 and the first-order transmission diffraction beams 22 in the photosensitive layer 15 of the copy hologram. A copy hologram the same as that shown in FIG. 6 is obtained in a similar fashion as FIG. 6.

As can be understood from the above discussion, according to the present invention, the inclined angles of the fringe planes can be controlled independently of the two-dimensional distribution or pattern of the interference fringes.

Figure 8:
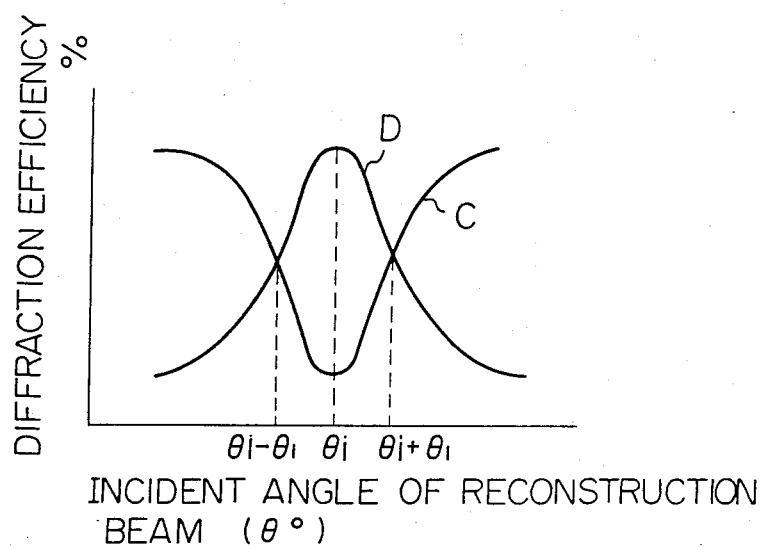
FIG. 8 is a graph of known characteristics of diffraction efficiency of a transmission beam and a first-order diffraction beam.

It is known that diffraction efficiencies of a zero-order transmission diffraction beam (plane wave) and a first-order transmission diffraction beam (spherical wave) with respect to an incident angle $\theta$ of a reconstruction beam are as shown in FIG. 8. In FIG. 8, the curves C and D correspond to the zero-order transmission beam and the first-order diffraction beams, respectively. As can be seen from FIG. 8, the diffraction efficiency of the first-order transmission diffraction beams represented by the curve D is maximum at the angle $\theta_i$, which is an incident angle of reconstruction beams identical to one of the two kinds of construction beams which have been used for constructing the hologram, but the diffraction efficiency of the transmission beams is minimum at the angle $\theta_i$. Namely, when the hologram is reconstructed by use of reconstruction beams (incident angle $\theta_1$) identical to one of the construction beams, the intensity of the first-order transmission diffraction beams (e.g., 6A) is about 3 to 10 times the intensity of the zero-order transmission beams (e.g., 5A'). Such a large difference in intensity between the two split beams, i.e., the zero-order transmission beams and the first-order transmission diffraction beams, may be particularly disadvantageous when the hologram is adapted to split a laser beam, i.e., when the hologram is used as a beam splitter. Therefore, if the intensities of the two beams split by the hologram must be identical to each other, the incident angle $\theta$ of the copy beams is selected to be $\theta_i - \theta_1$ (or $\theta_i + \theta_1$), at which the curves C and D intersect, i.e., at which the intensities of the zero-order transmission beams and the first-order transmission diffraction beams are identical to each other.

Figure 9:
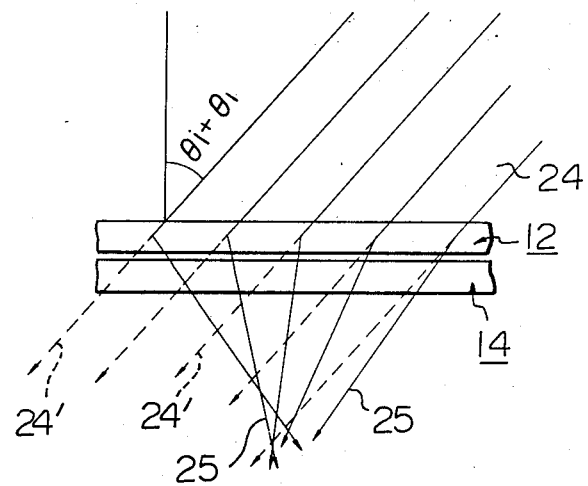
FIG. 9 is a schematic view of still another embodiment different from FIG. 7.

FIG. 9 shows an arrangement in which the copy beam 24 impinges on the master hologram plate 12 at an incident angle equal to $\theta_i + \theta_1$ to construct the copy hologram plate 14. In this arrangement, the intensity of the zero-order transmission beams 24' is identical to that the first-order transmission diffraction beams 25.

Figure 10:
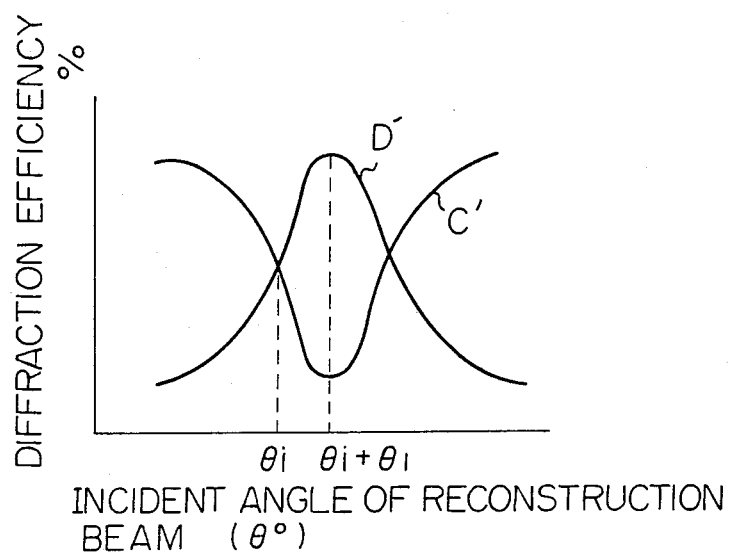
FIG. 10 is a graph similar to FIG. 8, but according to the present invention.

FIG. 10 shows diffraction efficiencies of the zero-order transmission beams (C') and the first-order transmission diffraction beams (D') when an incident angle $\theta$ of the reconstruction beams (copy beams) are $\theta_i + \theta_1$ ($\theta = \theta_i + \theta_1$). Therefore, when the copy hologram obtained by the invention is reconstructed, the incident angle of the reconstruction beams can be selected to be $\theta_i$ in order to make the intensities of the zero-order transmission beams and the first-order transmission diffraction beams split by the copy hologram equal to each other. Therefore, the copy hologram according to the present invention can be advantageously used also as a beam splitter. It will be appreciated that any desired ratio of the diffraction efficiency between the zero-order transmission beams and the first-order transmission diffraction beams can be obtained by properly selecting the incident angle $\theta$ of the copy beams 24 (FIG. 9).

Figure 11:
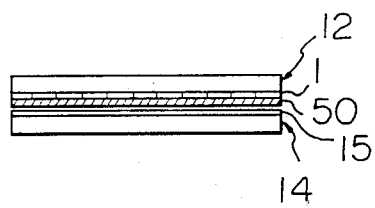
FIG. 11 is a schematic view of an embodiment for making intensities of the transmission beams and the first-order diffraction beams identical to each other.
Figure 12:
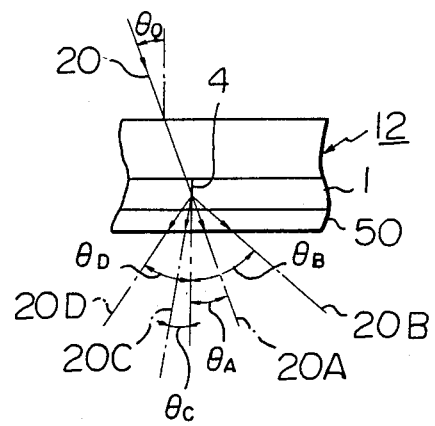
FIG. 12 is an enlarged view of a main part of FIG. 11.
Figure 13:
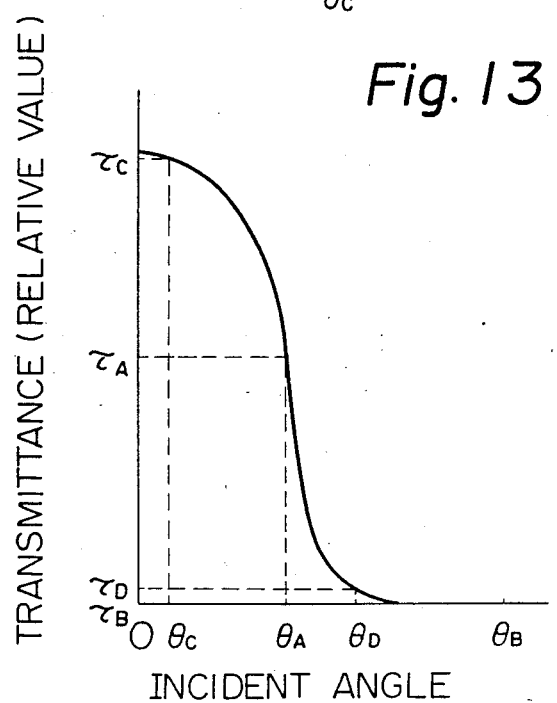
FIG. 13 is a graph of the transmittance characteristics of a filter used in the embodiment shown in FIGS. 11 and 12.

FIG. 11 shows a different embodiment for making the intensities of the zero-order transmission beams and the first-order beams identical to each other. In FIG. 11, a thin filtering layer 50 is formed on the master hologram (i.e., the photosensitive layer 1 having the master hologram recorded therein). The layer 50 is made of, for example, SiO$_2$ or TiO$_2$ having a transmittance as shown in FIG. 13. The layer 50 can be coated on the master hologram, for example, by a known evaporation coating method. Supposing that a copy beam 20 impinges on the master hologram plate 12 at an incident angle $\theta_0$, the beam 20 is split into a zero-order transmission beam 20A and diffraction beams 20B, 20C, 20D, etc., by an interference fringe 4 of the master hologram. The diffraction beams 20B, 20C, and 20D are a minus first-order transmission diffraction beam, a plus first-order transmission diffraction beam, and a plus second-order diffraction beam, respectively. The angles of the diffraction beams 20B, 20C, and 20D, with respect to the vertical direction are represented by $\theta_B$, $\theta_C$, and $\theta_D$, respectively. The angle of the zero-order transmission beam 20A is represented by $\theta_A$. The angles $\theta_A$, $\theta_B$, $\theta_C$, and $\theta_D$ are also incident angles with respect to the thin layer 50. By properly selecting the distance (pitch) d (FIG. 3) between the interference fringe planes of the master hologram and the incident angle $\theta_0$ of the copy beam 20, the angle $\theta_C$ can be set to be smaller than all of the angles $\theta_A$, $\theta_B$, and $\theta_D$. That is, $$|\theta_C| < |\theta_A|, |\theta_B|, |\theta_D|$$

Under the above-mentioned condition, the transmittance of the filtering layer 50 has characteristics as shown in FIG. 13. In FIG. 13, the transmittance $\tau_A$, $\tau_B$, $\tau_C$, and $\tau_D$ correspond to the incident angles $\theta_A$, $\theta_B$, $\theta_C$, and $\theta_D$, respectively. Since the intensity decreases as the angle (absolute value) of diffraction increases, the intensity $I_A$ of the transmission beam 20A is smaller than the intensity $I_C$ of the first-order transmission diffraction beam 20C. That is, $I_A < I_C$. Therefore, in order to make the intensities of the transmission beam 20A and the first-order transmission diffraction beam 20C identical to each other, the transmittance characteristics of the filtering layer 50 must satisfy the following relationship:

$$\tau_C \times I_C = \tau_A \times I_A$$

Thus, zero-order transmission beams and first-order transmission diffraction beams having the same intensity can be obtained.

As can be seen from FIG. 13, since $\tau_B$ is equal to zero and $\tau_D$ is almost equal to zero, the minus first-order diffraction beams 20B and the second-order transmission diffraction beams 20D can be substantially intercepted by the filtering layer 50, so that a copy hologram having a fringe pattern exactly corresponding to that of the master hologram, except the inclined angles $\alpha$ of the interference fringe planes, can be constructed by the interference of the zero-order transmission beams and the first-order transmission diffraction beams. Experimental results showed that when the copy beam 20 having a wavelength of 632.8 nm (nanometer) impinged on the master hologram plate having interference fringes at a pitch of 2 $\mu$m, at an incident angle of 15° ($\theta_0 = 15°$), the angles $\theta_A$, $\theta_B$, $\theta_C$, and $\theta_D$ were 3°, 15°, 22°, and 35°, respectively. A filtering layer 50 having transmittance-incident angle characteristics as shown in FIG. 13 can be easily prepared. The thickness of the layer 50 depends on a refractive index of the layer and is usually on the order of a few $\mu$m.

Figure 14:
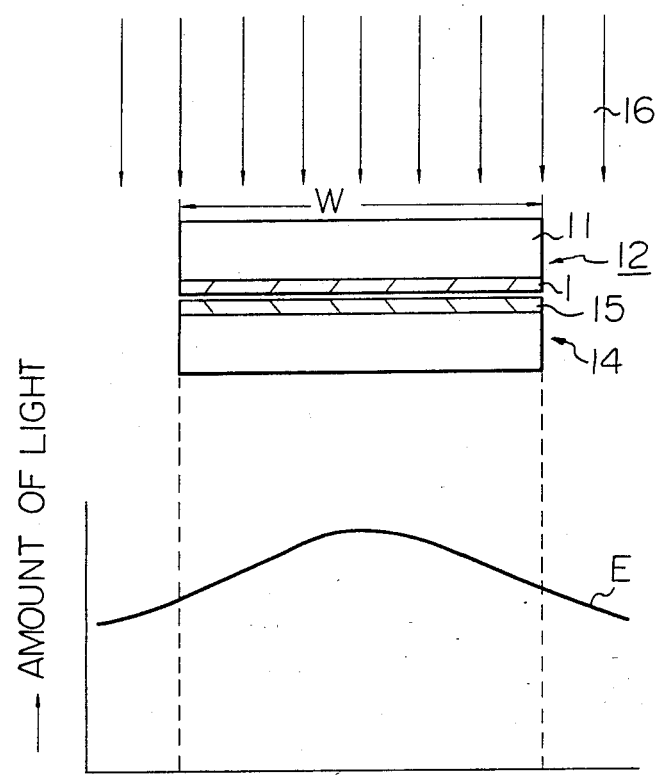
FIG. 14 is a schematic view of a relationship between the copy hologram and the amount of light of copy beams.
Figure 15:
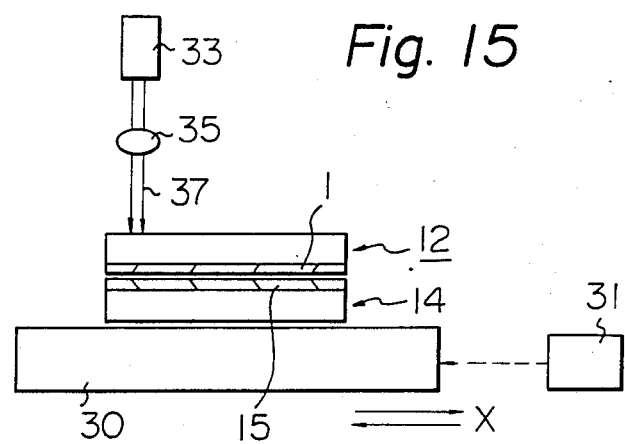
FIG. 15 is a schematic view of an embodiment of a movable bed for supporting a hologram assembly.
Figure 16:
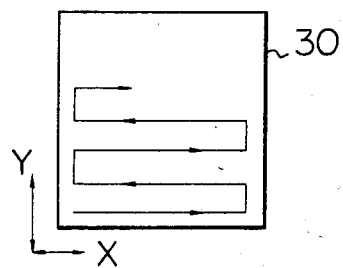
FIG. 16 is a plan view of a bed explaining the movements thereof.

When the copy beams or construction beams 16 are incident at one time over the entire width W of the master hologram plate 12, as shown in FIG. 14, the distribution of the amount of light is as shown by the curve E. This is because the laser beams emitted from a laser beams source are spread by a lens (not shown). That is, the exposure is maximum at the center of the hologram and becomes smaller toward the peripheries thereof. This irregular distribution of the amount of light or exposure may result in an imperfect copy of the master hologram. To solve this problem, the master hologram plate 12 and the copy hologram plate 14 on which a copy hologram is to be formed, are preferably located on a movable bed or table 30, as shown in FIG. 15. As mentioned above, the master hologram plate 12 is superimposed on the copy hologram plate so that the master hologram (i.e., photosensitive layer 1) comes into close surface contact with the photosensitive layer 15 of the copy hologram plate when copying is effected. The assembly, thus formed, is put on the movable bed 30, capable of moving in X and Y directions (FIGS. 15, 16) in a horizontal plane. The two-dimensional movement of the bed 30 can be effected, for example, by a numerical controller (NC) 31 or hydraulic device (not shown), which are known in the art. In FIG. 15, numerals 33, 35, and 37 designate a stationary laser beam source, a collimator, and spot-like laser beams, respectively. The bed 30 reciprocates in the direction X and moves a pitch at one time in the direction Y, as shown in FIG. 16, so that the laser beams 37 can be scanned over the entire surface of the master hologram plate 12 from above.

Figure 17:
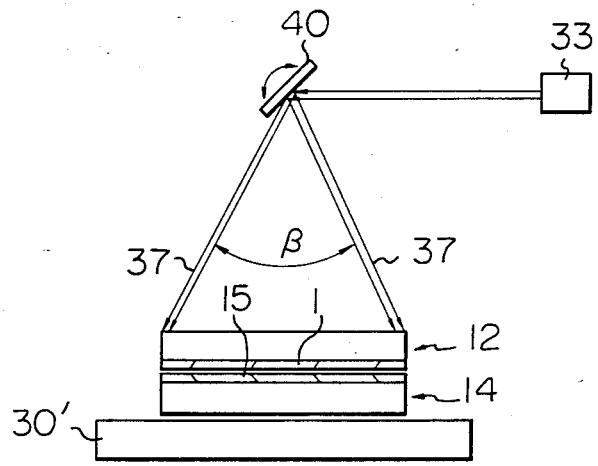
FIG. 17 is a schematic view of a device which is a variation of FIG. 15, for scanning the beams.

Alternatively, it is also possible to directly scan the laser beams 37 without moving the bed in the direction X, as shown in FIG. 17. In FIG. 17, the bed 30' moves in step motion only in the direction Y. The laser beams 37 emitted from the laser beam source 33 are swung through an angle $\beta$ by means of an optical deflector or an optical scanner 40, which are known, to cover the width W (FIG. 14) of the master hologram plate. The optical scanner 40 may be also, for example, a galvanometer which oscillates to scan the laser beams. The optical scanner 40 is available on the market, for example, from General Scanning Inc. of the U.S.

Figure 18:
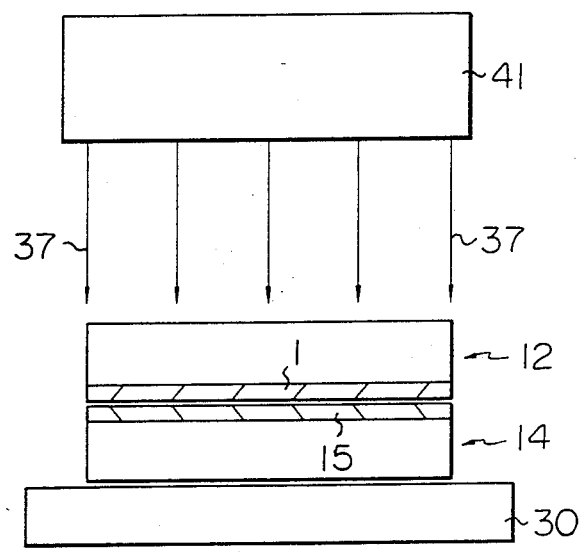
FIG. 18 is a schematic view of an embodiment in which wide copy beams are used.
Figure 19:
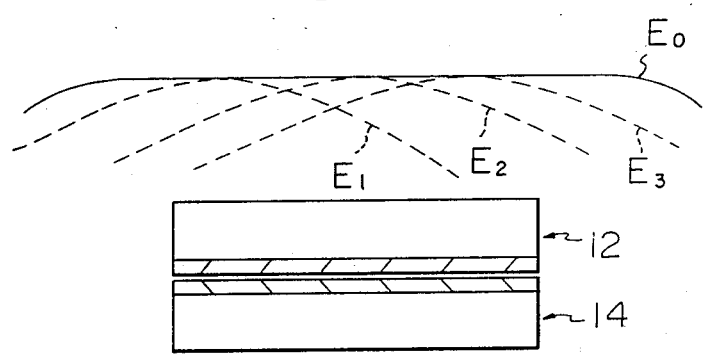
FIG. 19 is a schematic view of a resultant amount of the light of copy beams which are scanned.

In an arrangement shown in FIG. 18, the laser beams 37, which are spread by a lens 41, are used. In this arrangement, the distribution of the amount of light is not uniform, as mentioned before and as shown in FIG. 14. In order to make the distribution of the amount of light uniform over the entire surface of the master hologram plate 12, the movable bed 30 is moved in the directions X-Y, as mentioned above with reference to FIGS. 15 and 16. By the two-dimensional movement of the movable bed 30, the curve representing the amount of light changes as designated by $E_1$, $E_2$, $E_3$, etc. in FIG. 19, so that the resultant curve of the amount of light is $E_0$. Thus, even when the spread copy beams 37 are used, a uniform distribution of the amount of light as designated by the curve $E_0$ can be obtained by moving the bed 30. It can be easily understood that the uniform distribution in question can be achieved also by moving an optical laser system having the laser beam source (not shown) and the lens 41 in place of the movement of the bed 30. Furthermore, the reciprocal movements in the directions X and Y can be replaced by circular movement of the optical laser system or the bed along a circle having a center located at a center of the master hologram plate.

As reiterated hereinbefore, according to the invention, the incident angles $\theta$ of the copy beams are different from those of the two construction beams 2 and 3 used to construct the master hologram. However, when there is a large difference in the incident angle between the copy beams and the construction beams, only a small amount of light of first-order diffraction beams can be produced, which is not enough to produce a clear contrast between the interference fringes and the remaining sections, resulting in a low quality hologram. This problem can be solved by an embodiment shown by FIGS. 20 and 21.

Figure 20:
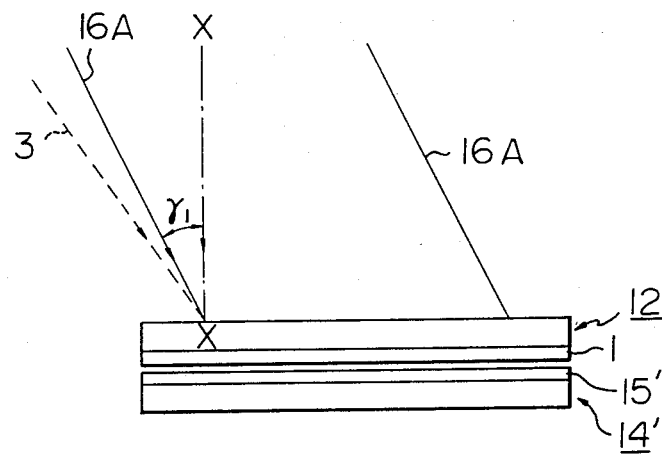
FIGS. 20 and 21 are schematic views of two successive steps in successive copyings according to the invention.
Figure 21:
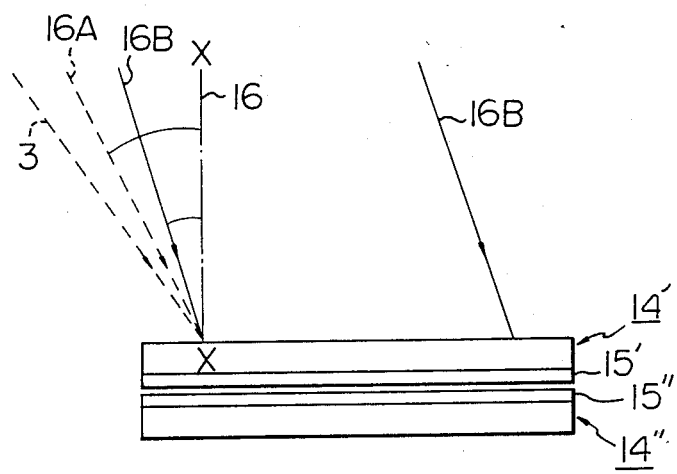

Supposing that the copy hologram is finally constructed by the copy beams 16 perpendicular to the master hologram plate, as shown in FIG. 5, a first copy hologram plate 14' is first constructed by copying the master hologram with the use of first copy beams 16A which are inclined at an angle $\gamma_1$ with respect to the vertical axis X—X (i.e., the final copy beams 16) and which lie, for example, between the construction beams 3 and the vertical axis X—X. Consequently, a first copy hologram plate 14' which has a first photosensitive layer 15' having a predetermined pattern of copy hologram therein, is constructed, as shown in FIG. 20. The inclined angle $\alpha$ (FIG. 3) of the copy hologram of the first copy hologram plate 14' is different from and is smaller than a finally desired inclined angle of the final copy hologram. Then, the first copy hologram plate 14' is used as a master hologram plate corresponding to the master hologram plate 1 shown in FIG. 5 to construct a second copy hologram plate 14" with a second photosensitive layer 15" having a predetermined pattern of a second hologram by the use of copy beams 16B which are inclined at an angle $\gamma_2$ with respect to the vertical axis X—X. The angle $\gamma_2$ is smaller than the angle $\gamma_1$. That is, the second hologram is constructed by copying the first hologram, using a method similar to FIG. 5. Such copying operations are repeated by using successive copy beams which gradually change the inclined angles $\gamma$ with respect to the vertical axis. Finally, the vertical copy beams 16 as shown in FIG. 5 are used to construct a desired copy hologram. According to the method shown in FIGS. 20 and 21, since successive copies are repeated by using successive copy beams which have inclined angles gradually approaching that of the desired final copy beams, a desired hologram having a clear contrast can be obtained. The successive copy beams have, preferably, the same wavefronts, and, for example, are all plane waves, but are not limited thereto.

Figure 22:
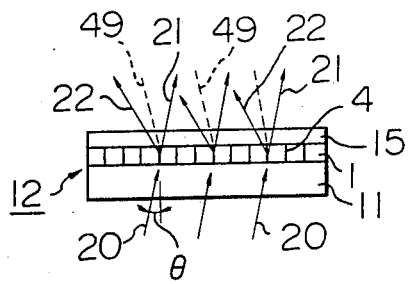
FIGS. 22 to 24 are schematic views of three successive steps of production of a multilayered hologram according to the present invention.
Figure 23:
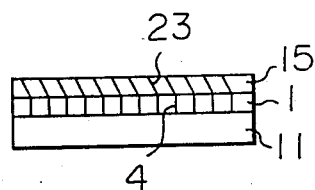
Figure 24:
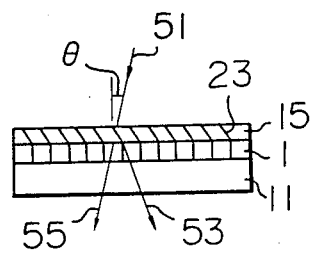

On copying the copy hologram from the master hologram, the copy hologram plate must be in close surface contact with the master hologram plate. Failure of close surface contact between the master hologram and the photosensitive layer on which the copy hologram is to be constructed results in production of an unclear pattern of interference fringes on the copy hologram plate due to a decrease of diffraction efficiency and production of undesirable copy fringes in the copy hologram. In order to eliminate these disadvantages, according to an embodiment illustrated in FIGS. 22 to 24, a multilayered hologram is provided. That is, the photosensitive layer 15 in which a copy hologram is to be constructed is directly formed on the master hologram without providing the glass plate 13 for the copy hologram. In FIGS. 22 to 24, the master hologram 4 is constructed in the photosensitive layer 1 of the glass plate 11 by the method of the invention mentioned above. When the master hologram is constructed, the construction beams 2 (Bragg angle=$\theta_1$) and 3 (Bragg angle=$\theta_2$) (FIG. 3) to be used have small diffraction efficiencies. The master hologram may be either an amplitude hologram or phase hologram. The diffraction efficiency is, preferably, about 5% to 10% in the case of the phase hologram and about 1% to 2% in the case of the amplitude hologram. It is known that a hologram pattern presents a clear contrast and the diffraction beams have a high intensity when the photosensitive layer for the hologram is subject to sufficient exposure and vice versa. Therefore, a low diffraction efficiency hologram can be easily obtained by adjusting, i.e., decreasing, the exposure. Then, the photosensitive layer 15 is coated directly onto the photosensitive emulsion layer 1 of the master hologram plate 12. After that, the copy beams 20 impinge on the glass plate 11 of the master hologram plate 12 at an angle $\theta_0$ with respect to the vertical direction. The angles $\theta$ of the copy beams 20 are different from those ($\theta_1$ and $\theta_2$) of the construction beams 2 and 3, according to the invention. Exposure of the layer 15 by means of the first-order transmission diffraction beams 22 and the zero-order transmission beams 21 forms, a latent image of a fringe pattern, i.e., a copy hologram is formed in the layer 15. The interference fringes are on the bisector lines 49 between the associated zero-order transmission beams and the first-order transmission diffraction beams, as mentioned before. The latent image appears by developing and fixing the glass plate 11 with the multilayered photosensitive emulsions 1 and 15, so that the copy phase hologram 23 is constructed (FIG. 23). Since the inclined angle of the fringe planes of the copy hologram 23 is different from that of the fringe planes of the master hologram 4, as mentioned above, the presence of the master hologram can be disregarded when the diffraction efficiency of the copy hologram is considerably large in comparison with that of the master hologram. Thus, the copy hologram having the Bragg angle $\theta$ is provided directly on and integrally with the master hologram plate (FIG. 24). Therefore, there is no fear of failure of close surface contact between the master hologram and the copy hologram. In the copy hologram shown in FIG. 24, the reconstruction beams 51 impinging on the copy hologram at an angle $\theta$ with respect to the vertical direction are used, so that the Bragg condition is satisfied, resulting in production of diffraction beams 53 having the maximum intensity. The numeral 55 in FIG. 24 designates a zero-order transmission beam diffraction. If the base hologram is of the amplitude type, the copy hologram 15 is converted to the phase hologram by bleaching it, if necessary. It will be appreciated that since the material of the photosensitive emulsion layer 15 can be properly selected so as to make the intensities of the zero-order transmission beams 21 and the first-order transmission diffraction beams 22 identical to each other as mentioned before, the interference fringes of the copy hologram can be clearly made. By using the first-order transmission diffraction beams 53 diffracted by the copy hologram, the copy hologram can be advantageously used as a hologram scanner.

EXAMPLE 1

This example is directed to an amplituide type master hologram. Two beams of an Ar laser were applied incident on Kodak 120-01 (tradename) at angles of ±15° with respect to the vertical direction. The angle defined by and between the two beams was 30°. After the development and fixing treatments, a low diffraction efficiency amplitude hologram (master hologram) 4 having an optical density (OD) of about 0.4 was constructed. The Bragg angles of the hologram are ±15° (=$\theta$). A thin layer (photosensitive layer 15) of 4 to 5 $\mu$m consisting of dichromated gelatin was then coated on the hologram. After that, the copy beams 20 of the Ar laser were applied incident on the thin layer 15 from the side of the master hologram at an incident angle 30° with respect to the vertical direction to expose the dichromated gelatin. After exposure, the dichromated gelatin was developed and fixed. Consequently, the dichromated gelatin was converted to a phase type copy hologram 23 having a Bragg angle of 30° and a diffraction efficiency above 70%. The entire assembly was bathed in Bromine gas, so that the amplitude type master hologram 4 was bleached and converted to a phase type hologram. However, since the phase master hologram has a small optical density of 0.4, the diffraction efficiency thereof was small enough to be ignorable. Thus, as a whole, a phase hologram having a Bragg angle of 30° (=$\theta$) and a diffraction efficiency above 70%, was obtained.

EXAMPLE 2

This example is directed to a phase type master hologram. A master hologram base plate was used having a glass plate 11 with a photosensitive layer 1 having a thickness of 1 to 2 μm and consisting of polyvinyl carbazole (PVCz) coated thereon. Two beams of an Ar laser were applied incident on the base plate in a way similar to Example 1. After the development and fixing treatment, a phase type master hologram 4 having a Bragg angle of ±15° and a diffraction efficiency of 5% to 10%, was obtained. A thin layer of 4 to 5 μm consisting of PVCz was coated on the master hologram. The copy beams 20 of the Ar laser were then applied incident on the thin layer at an incident angle of 30° to expose the PVCz layer. The PVCz layer was converted to a phase type copy hologram 23 having a Bragg angle of 30° and a diffraction efficiency of about 70%. The master hologram located under the copy hologram had a small diffraction efficiency ignorable in comparison with that of the copy hologram. Therefore, a two-layered phase type hologram was similarly constructed as in to Example 1.

We claim:

1. A method for constructing a hologram, forming a copy hologram, and reconstructing the copy hologram utilizing first order transmission diffraction beam, the transmission diffraction beam produced using a master hologram plate having a base plate with a master hologram including a predetermined pattern of interference fringes formed thereon by optical interference of a plurality of constructing coherent light beams incident upon the base at different angles, the constructing coherent light beams having incident angles different from the incident angles of a reconstruction beam of a copy hologram except for one specific point, said method comprising the steps of:
    (a) forming a photosensitive medium in which the hologram is to be formed, on a copy hologram plate; and
    (b) copying the master hologram onto the photosensitive medium by impinging a copying light beam onto the master hologram at an incident angle substantially different from the incident angles of the constructing coherent light beams, to produce a zero-order transmission beam passing through the associated interference fringes of the master hologram and a first order diffraction beam diffracted by the associated interference fringes of the master hologram, whereby a desired copy hologram having the same pattern of interference fringes as the master hologram is constructed in the photosensitive medium by optical interference of the zero-order transmission beam and the first-order diffraction beam, said copy hologram being reconstructed with a reconstruction beam substantially different from the constructing coherent light beams, so that a beam issuing from the copy hologram has a corrected aberration.

2. A method according to claim 1, wherein said step (a) of forming the photosensitive medium comprises directly coating a photosensitive layer onto the master hologram plate.

3. A method according to claim 1, wherein said step (a) of forming the photosensitive medium comprises forming a copy hologram base plate having a photosensitive layer coated thereon and which is superimposed on the master hologram plate so that the photosensitive layer comes in close surface contact with the master hologram plate.

4. A method according to claim 1, wherein said step (b) comprises impinging the copying light beam onto the master hologram at an angle perpendicular thereto.

5. A method according to claim 1, wherein said step (b) comprises impinging the copying light beam at an incident angle identical to those of the first-order diffraction beams with respect to the photosensitive medium.

6. A method according to claim 1, wherein said step (b) comprises impinging the copying light beam at an incident angle such that the transmission beams and the first-order diffraction beams have the same diffraction efficiency.

7. A method according to claim 1, further comprising the step of coating a filtering layer on the master hologram prior to said step (a) of forming the photosensitive medium on the master hologram plate, the filtering layer having a transmittance which decreases as the incident angle of the beams incident thereupon, with respect to a line perpendicular to the filtering layer, increases, to selectively intercept the beams having an incident angle above a predetermined value.

8. A method according to claim 1, wherein said step (b) comprises impinging the copying light beam over the entire width of the master hologram plate.

9. A method according to claim 8, wherein said step (b) comprises scanning the copying light beam relative to the master hologram plate.

10. A method according to claim 8, wherein said step (b) comprises moving the master hologram plate together with the photosensitive layer for the copy hologram, relative to the copying light beam.

11. A method according to claim 1, wherein said step (b) comprises impinging spot-like beams as the copying light beam.

12. A method according to claim 12, wherein step (b) further comprises the step of scanning the spot-like beams relative to the master hologram plate.

13. A method according to claim 11, further comprising the step of moving the master hologram plate together with the photosensitive medium relative to the spot-like beams of the copying light beam for forming the copy hologram.

14. A method for constructing a desired hologram, forming a copy hologram, and reconstructing the copy hologram utilizing a first order transmission diffraction beam, using a master hologram plate having a base plate with a master hologram including a predetermined pattern of interference fringes formed thereon by optical interference of a plurality of constructing coherent light beams incident upon the base plate at substantially different angles, the constructing coherent light beams having incident angles different from the incident angles of a reconstruction beam of a copy hologram except for one specific point, said method comprising:
    (a) forming a first photosensitive medium, in which a first hologram is to be formed, on the master hologram plate;
    (b) copying the master hologram onto the first photosensitive medium by impinging a first copying light beam onto the master hologram at an incident angle substantially different from the incident angles of the constructing coherent light beams, to produce a transmission beam passing through the associated interference fringes of the master hologram and first-order diffraction beams diffracted by the associated interference fringes of the master hologram, whereby a first copy hologram having the same pattern of interference fringes as the master hologram is constructed by optical interference of the transmission beam and the first-order diffraction beams;

(c) forming a second photosensitive medium in which a second hologram is to be formed, on the first copy hologram;

(d) copying the first copy hologram onto the second photosensitive medium by impinging a second copying light beam onto the first copy hologram at an incident angle substantially different from the incident angles of the constructing coherent light beams and the first copying light beam, to produce a zero-order transmission beam passing through the associated interference fringes of the master hologram and first order diffraction beams diffracted by the associated interference fringes of the master hologram, to construct a second hologram, having the same pattern of interference fringes as the master hologram, in the second photosensitive medium in a manner similar to the construction of the first copy hologram; and (e) reconstructing the second hologram with a reconstruction beam substantially different from the constructing coherent light beams so that a beam issuing from the second hologram has a corrected aberration.

* * * * *

UNITED STATES PATENT AND TRADEMARK OFFICE
CERTIFICATE OF CORRECTION

PATENT NO. : 4,904,033
DATED : FEBRUARY 27, 1990
INVENTOR(S) : HIROYUKI IKEDA ET AL.

It is certified that error appears in the above-identified patent and that said Letters Patent is hereby corrected as shown below:

Col. 1, line 6, "relates" (second occurrence) should be deleted.

Col. 3, line 68, "transmission beam" should be --transmission diffraction beam--.

Col. 7, line 12, "the transmission" should be --the zero order transmission--.

Col. 8, line 3, "a pitch at one time" should be --one pitch at a time--. (second occurrence)

Col. 9, line 66, "21 forms," should be --21, forms--.

Col. 11, line 23, "to" should be deleted.

Signed and Sealed this

Twenty-eighth Day of May, 1991

Attest:

HARRY F. MANBECK, JR.

Attesting Officer

Commissioner of Patents and Trademarks